July 21, 1942.   F. J. BLACK, SR   2,290,529
DEVICE FOR MEASURING ROTATING WORKPIECES
Filed Aug. 23, 1941   2 Sheets-Sheet 1
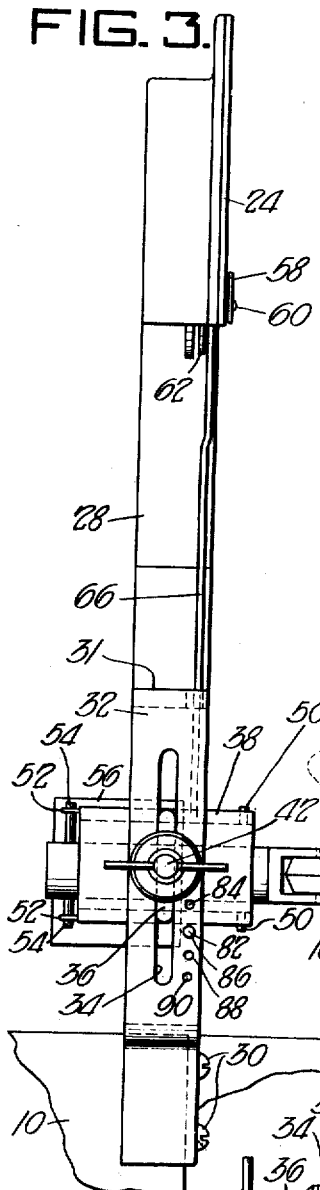
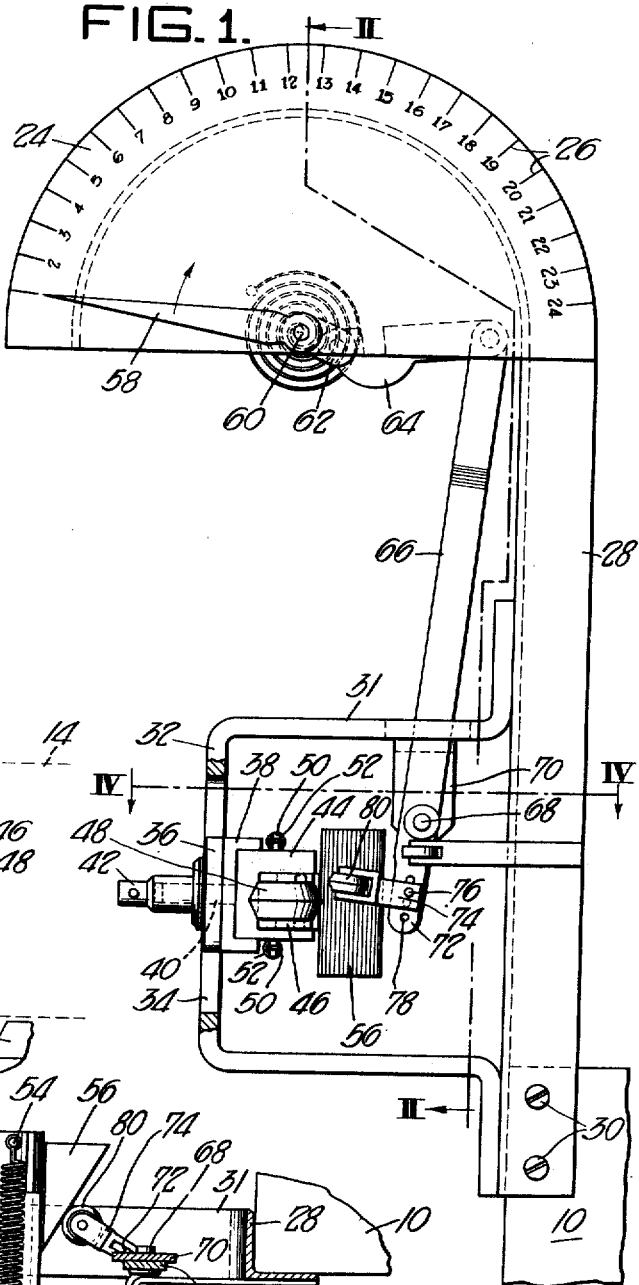
Inventor:
FRANK J. BLACK, SR.,
by John E. Jackson
his Attorney July 21, 1942.  F. J. BLACK, SR  2,290,529
DEVICE FOR MEASURING ROTATING WORKPIECES
Filed Aug. 23, 1941  2 Sheets-Sheet 2
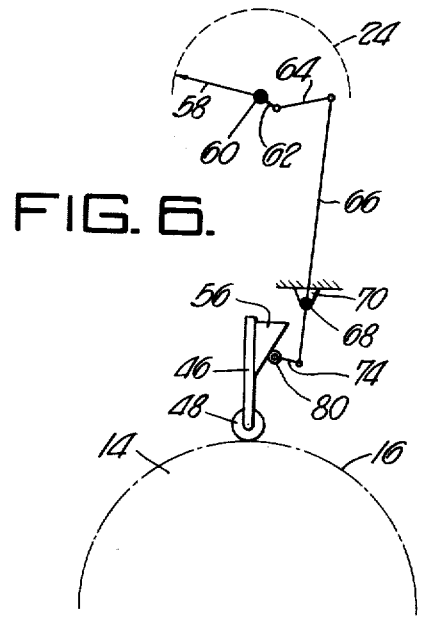
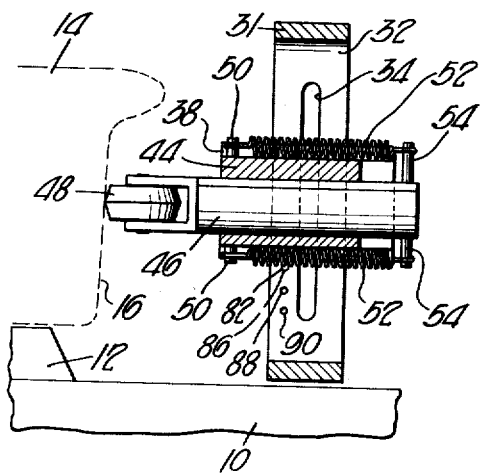
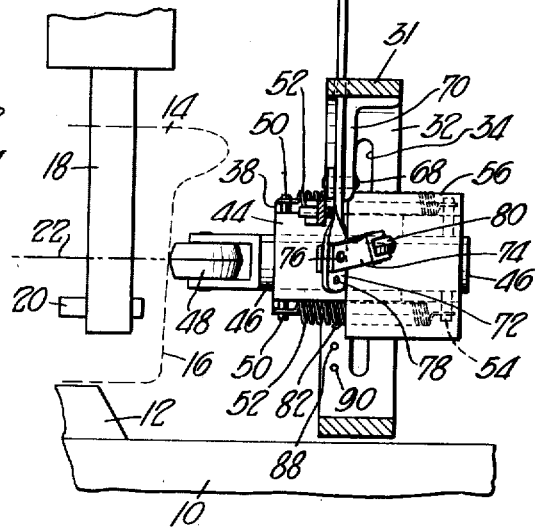
inventor:
FRANK J. BLACK, SR.,
by John E. Jackson
his Attorney Patented July 21, 1942

2,290,529

UNITED STATES PATENT OFFICE 2,290,529

DEVICE FOR MEASURING ROTATING WORKPIECES

Frank J. Black, Sr., Crafton, Pa.

Application August 23, 1941, Serial No. 408,095

6 Claims. (Cl. 33—178)

This invention relates to specific features of improvement in devices for indicating the diameter of circular workpieces during the machining or turning thereof.

It is broadly old to provide calipering devices which indicate the diameter of a turning workpiece. The present invention relates to specific features of construction and arrangement whereby the work contacting follower can be adjusted relative to the workpiece such as a tapering workpiece, and whereby similar adjustments can be made in other parts of the device so as to maintain accuracy of the diameter reading regardless of the adjustments made to the parts.

While not limited thereto, the invention is peculiarly well suited for use in connection with a turning or boring mill such as used for finishing the treads of railroad car wheels which are normally machined to a standard taper. However, with slight modifications the invention can be adapted to similar measurements of other circular objects, such as disks, sheaves, pulleys, gear blanks, etc. Generally, railroad car wheels comprise a single piece, either of cast iron or forged rolled steel. The wheel is usually finished as to tread size and other important dimensions by a machine turning operation. From the standpoint of service, the tread diameter is the most critical dimension. This is true because it is necessary to machine the circumference of each of a pair of wheels which are to be mounted on a single axle in order to insure most effective operation in normal railway service.

Prior to the present invention the general practice was to measure the tread circumference by the use of an endless steel tape graduated in eighths of an inch beginning with 7 feet as a zero mark for wheels 28 inches and over in diameter and with 4 feet as a zero mark for wheels of smaller diameter. In the railway car industry, this matching of the circumferences of a pair of wheels intended for mounting on a single axle is termed "mating." According to the standard specifications of the Association of American Railroads, the limit of the allowable variation in mating is one-half tape size, which means a variation of 1/16 inch in circumference. This is equal to approximately .01 inch in radius. Heretofore in practice the taping line was specified at a predetermined location on the face of the car wheel intermediate the front face of the rim and flange of the wheel, it being remembered that standard car wheels are slightly coned and are thus substantially frusto-conical in form.

Heretofore as a means for insuring that the wheel would be taped at the proper taping line, the tape was provided at intervals with lugs adapted to engage the wheel flange so as to thus position the tape for measurement at the predetermined proper taping line location.

Heretofore in the machining of wheel treads upon a boring mill or like turning tools, it has been necessary for the operator to stop the machine several times during the machining operation as the circumference of the wheel approaches the required dimension in order to tape or gage the wheel. This is a slow and costly procedure. Moreover, in the conventional practice of taping the wheel there are several variables which have a tendency for causing the making of inaccurate measurements. For example, the tape lugs may not be given the proper bearing against the wheel flange, the amount of tension manually exerted in tightening the tape may be applied non-uniformly from wheel to wheel or individual operators may make different interpretations of the indicated tape reading. Thus this prior practice of stopping the machining operation appreciably reduces the production capacity and if inaccurate taping results in the wheel being machined to a diameter below the .01 radius mating tolerances, the wheel must be discarded for a specific mating and the machining continued to a radius which will be satisfactory for mating with a smaller wheel. If the wheel is finished oversize by more than .01 radius, it may be rejected upon inspection. A particular difficulty arises because of the necessity of accurately determining the exact circumferential measurement at a given peripheral taping line on a tapered car wheel. Thus there are problems solved by the present invention which are not inherent in the calipering of ordinary cylindrical workpieces.

The present invention aims to solve the problems mentioned and to overcome the shortcomings of prior practice by the provision of the specific improved apparatus, constructed and arranged as shown in the accompanying drawings and as herein claimed in detail.

In the drawings:

Figure 1 is an enlarged elevation of a measuring device adapted for indicating the diameter of a workpiece during the turning thereof;

Figure 2 is a vertical section on line II—II of Figure 1 showing the indicating device of the present invention mounted on a standard form of boring mill adapted for machining car wheels;

Figure 3 is a view from the left of Figure 1;

Figure 4 is a horizontal section on line IV—IV of Figure 1;

Figure 5 is a vertical view on line V—V of Figure 1; and

Figure 6 is a skeleton view diagrammatically illustrating certain of the essential elements of the indicating device of the present invention.

Referring in detail to the drawings, the numeral 10 represents the base of a conventional boring mill or turning machine which carries a conventional form of chuck 12 for gripping and turning the car wheel or similar workpiece 14 whose periphery 16 it is desired to finish to a predetermined dimension. The machine illustrated includes a conventional tool holder 18 which carries a conventional turning tool 20. The chuck, tool holder and turning tool form no part of the present invention and are only diagrammatically indicated.

A particular feature of the present invention relates to the means for indicating at all times the diameter of the workpiece being turned. In the case of tapered car wheels, it is desirable for the operator to be able to know for a certainty the exact diameter or peripheral dimension at a predetermined zone on the tapered face of the wheel. This zone is indicated by the dot and dash line 22 in Figure 2 and is known to those skilled in the manufacturing of standard cone tread car wheels as the taping line.

The present invention makes it possible for the operator to determine the circumference, diameter or radius of the car wheel at any desired taping line location while the wheel is being machine turned. To this end I provide the means hereinafter described for permitting variable adjustment of the follower in a direction axially of the cone treaded wheel.

I also provide means for indexing the portion of the work engaging follower as well as certain adjustments of a cam engaging member which transmits the motion to the indicator hand of the device.

A fixed arcuate scale 24 is provided with a plurality of circularly spaced calibrations 26 which in the embodiment of the invention illustrated are in the nature of index numbers indicative of wheels having a taping line of predetermined circumference, diameter or radius. This index scale is mounted on the upper extremity of a standard 28 which is secured by suitable fastening devices 30 to any fixed part of the frame of the machine. The standard 28 in the embodiment illustrated is in the nature of an angle bar whose upper extremity is curved to suit the diameter of the scale disk.

Secured to the front face of the standard I provide a bale-like bracket 31 whose outermost portion 32 is formed with an elongated slot 34 through which projects the tongue 36 of a mounting 38. The mounting carries a screw 40 which coacts with a thumb nut 42 by means of which the mounting can be adjusted vertically with respect to the fixed bracket.

A guide block 44 is secured to the mounting and it in turn slidably supports a plunger 46 which at its outer extremity has journaled therein a follower roller 48 which is adapted to engage the periphery of the tapered surface being machined and to be measured. The block 44 near its forward extremity carries pins 50—50 which are engaged by the forward ends of springs 52—52, whose rear extremities are engaged with pins 54—54 carried by the plunger 46. As thus arranged it will be apparent that the springs 52—52 yieldingly urge the plunger 46 and the roller 48 toward the surface of the tapered wheel being machined. Preferably the follower roller 48 is of the crowned formation illustrated and is made of high grade wear-resistant alloy steel so as to maintain the accuracy of the apparatus.

The follower actuated plunger 46 has secured thereto a wedge-like cam member 56 by means of which motion is transmitted to the indicator hand 58 which is preferably mounted on a shaft 60 journaled centrally of the fixed arcuate scale. The shaft 60 carries a crank arm 62 which is connected by a link 64 with the upper extremity of a lever 66 which is pivotally mounted at 68 to bearing 70 carried by the fixed bracket 31. Near the lower extremity 72 of the lever 66 there is adjustably mounted a laterally extending arm 74 whose position with respect to the pivot point 68 of the lever 66 can be varied by engaging the locating pin 76 with one of a plurality of holes 78 formed in the lower extremity 72 of the lever for a purpose to be presently described.

Rotatably mounted on the outer extremity of the laterally extending arm 74 there is a roller 80 which rides on the inclined face of the cam 56. With the parts thus arranged it is apparent that the follower 48 will be forcibly pressed against the surface of the work being machined, and through the connections shown and described the diameter or radius of the work will be indicated by the hand 58 and the markings on the dial. Thus at all times the operator will be accurately appraised of the variations in radius or diameter occasioned by the cut being made by the turning tool. Because the types and sizes of car wheels vary, it is important to be able to set the mechanism so as to permit gaging at tape lines located at different positions longitudinally of the wheel. For this reason it will be appreciated that the adjustable mounting 38 is highly desirable.

It will be understood that by loosening the thumb screw 42 the mounting 38 can be adjusted up or down so as to permit of gaging the wheel at different taping lines to suit the different locations for various sizes of wheels. To facilitate quick setting to different standard taping lines, there is provided an index or locating pin 82 which is adapted to be inserted in any of the several openings 84, 86, 88 or 90. The four holes indicated by way of illustration correspond to four predetermined taping line locations for four different predetermined types or sizes of wheels. The locating pin 82 serves as a quick and convenient means for adjusting the follower. When it is adjusted it becomes necessary to make a similar adjustment of the member 74. Accordingly, there are a plurality of holes 78 in the lower extremity 72 of the pivoted arm corresponding in position to the locating holes 84, 86, 88 and 90.

As illustrated, the parts have been assumed to be set for the second position. Thus the locating pin 82 is inserted in the hole 86, which is the second hole from the top, and similarly the pin 76 connecting the member 74 with the lower extremity 72 of the pivoted arm 66 is likewise connected to the second hole 78 in the pivoted arm. It will thus be understood that the pins 82 and 76, respectively, can be correspondingly engaged with the other locating holes so as to properly set the device for indicating taping lines on corresponding portions of different sized wheels.

From the foregoing it is apparent that the invention deals with a very specific problem and provides means whereby a precise setting of the parts can be made to facilitate quick and easy reading of the taping line diameters of wheels of various sizes. In this way a great number of matching wheels of any desired size can be readily produced.

In a typical operation, the tread of the first wheel of a given series, which are to have the same mating circumference, is carefully machined to the correct dimension. The index number indicated by the indicator hand 58 is then noted. This number serves as an index to inform the operator engaged in machining the remaining wheels of a series. A second wheel is now set up in the mill and the machining operation thereon is continued until the indicator hand points to the established index number on the fixed dial, thus indicating to the operator that the required amount of material has been machined off to give the desired wheel size.

With the device described it is possible to measure variations of .001 inch in radius, thus the production of wheels within the mating tolerances usually permitted by the railroad specifications is made possible. In the case of making wheels where such accuracy is not required, the use of the gage described permits the operator to work the upper limit of the tolerance range and thereby supply the consumer with wheels which will give greater mileage.

While I have described quite precisely the design and arrangement of the embodiment of the invention herein illustrated, it is to be understood that the drawings and descriptive matter are to be interpreted in an illustrative rather than a limiting sense since various modifications and substitutions of equivalents may be made by those skilled in the art without departure from the scope of the invention as defined in the appended claims.

I claim:

1. A device for indicating the size of a circular workpiece during the machine turning thereof comprising a follower contacting the turning workpiece, a wedge-like cam reciprocated by the follower, a fixed bracket, a mounting adjustable therein slidably supporting said follower whereby it can be selectively positioned for calipering engagement with different zones of the workpiece, means for indexing the adjusted positions of said mounting relative to said fixed bracket, a fixed scale, a hand cooperating therewith, means for operating the hand comprising a pivoted lever having a linkage connected with the hand, said lever having a member secured thereto carrying a roller coacting with said cam, and means for adjustably securing said member to the lever in a plurality of index positions adapted to correspond with the indexed positions of adjustment of said mounting.

2. A device for indicating the diameter of a circular workpiece during the machine turning thereof comprising a follower contacting the turning workpiece, a cam-like member reciprocated by the follower, a guide block in which the follower is slidably mounted, said cam being arranged to partake of the sliding movement of the follower, an adjustable mounting for the guide block adapted to position the follower at selected zones across the face of the workpiece being machined, a fixed scale calibrated with index numerals indicative of varying diameters, an indicator hand, a pivoted lever having a link connected with said hand, said lever having an element operatively connected thereto and arranged for coaction with said cam, and a spring acting through said linkage and said lever to normally press said element into operative contact with said cam.

3. The apparatus of claim 2, including a mounting for said element adjustably mounted on said lever with respect to the pivot of the lever.

4. A device for indicating the diameter of a circular workpiece during the machine turning thereof comprising a follower contacting the turning workpiece, a wedge reciprocated by the follower, a fixed bracket, a mounting for the follower slidable in the bracket, means for indexing the position of the mounting relative to the bracket, a guide block for the follower carried by said mounting, a spring secured at one end to a pin in the guide block and at its other end to a pin in said plunger, a scale calibrated with index numbers indicative of different diameters, a hand pivotally mounted in juxtaposition to said scale, a pivoted lever having a connection with said hand, a member adjustably connected to said lever and carrying an element which coacts with said wedge, and spring means acting through said connection and said pivoted lever for constantly pressing said element against said wedge.

5. The apparatus defined in claim 4, wherein said follower is a crowned roller of wear resistant metal, and wherein one extremity of said plunger carries a bearing for said roller, the plunger being slidable in said guide block toward and from the workpiece.

6. In an apparatus for successively machining the peripheral surfaces of a series of circular tapered workpieces to the same predetermined diameter, a follower contacting the periphery of the workpiece, an adjustable mounting for the follower, means for indexing the position of said mounting, a wedge-like element movable by the follower, a roller positively maintained in contact with said element, an indicating hand, a dial, motion transmission connections including a pivoted lever operatively associating the hand with said roller, a support for said roller adjustably mounted on said lever, and means for indexing the position of said support, said dial being calibrated in index numbers in coordination with the movement of said roller whereby an index number can be established to indicate when each workpiece of a series has been machined to the same predetermined diameter.

FRANK J. BLACK, Sr.